United States Patent Office 3,105,348
Patented Oct. 1, 1963

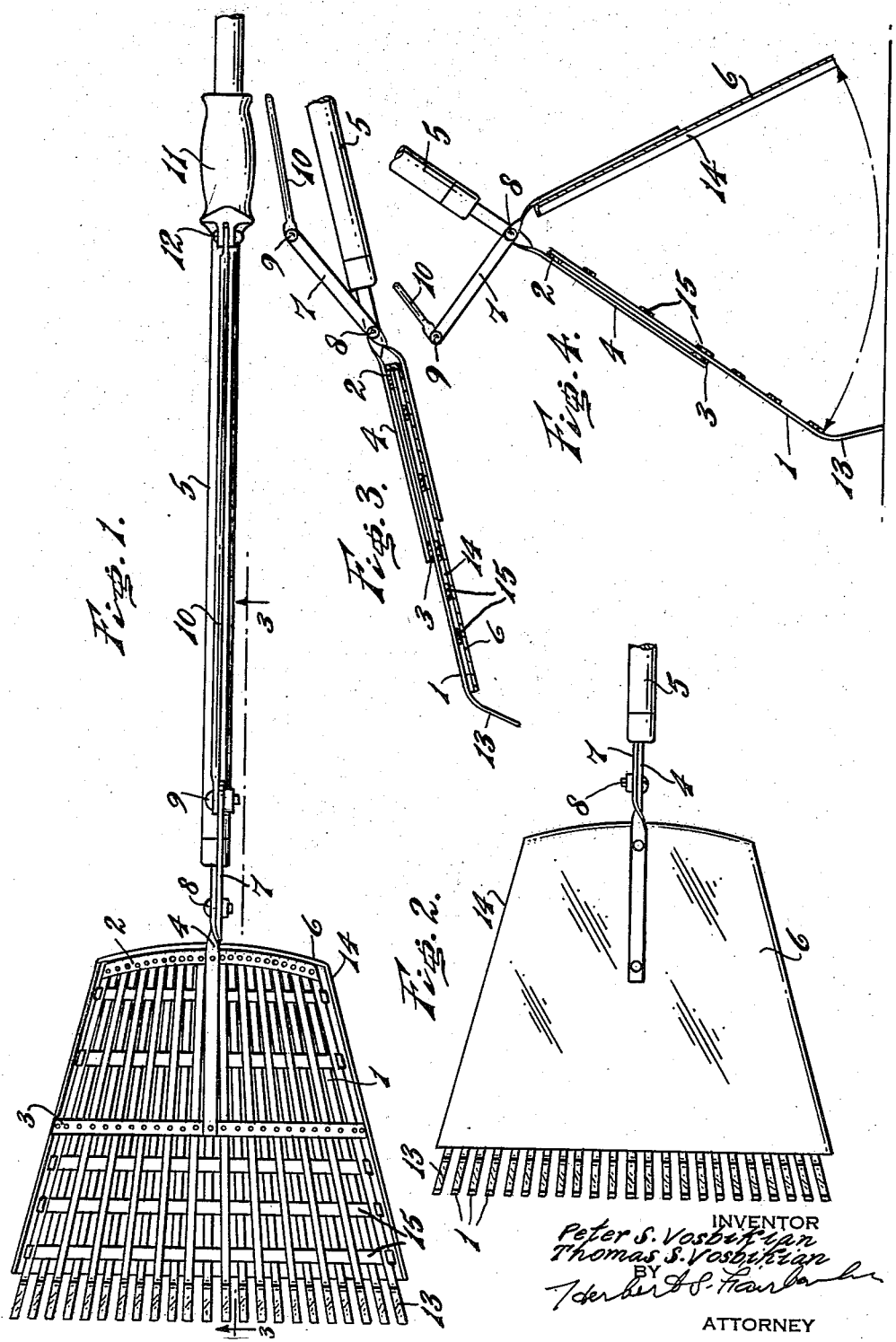

3,105,348
GARDEN RAKE WITH MATERIAL RETAINING MEANS
Peter S. Vosbikian, Melrose, and Thomas S. Vosbikian, Philadelphia, Pa. (both of 20th and Oxford Sts., Philadelphia, Pa.)
Filed Mar. 29, 1962, Ser. No. 183,602
1 Claim. (Cl. 56—400.12)

The object of this invention is to devise a novel construction and arrangement of a garden rake and more particularly to devise novel means to clamp the material which has been raked up against the teeth of the rake.

A further object of the invention is to provide the rake with a clamping plate which is clamped against the rake head during the raking operation in such a manner that it does not interfere with the raking operation.

With the foregoing and other objects in view as will hereinafter clearly appear, our invention comprehends a novel construction and arrangement of a garden rake having a novel construction and arrangement of a clamping plate which after the material has been raked up can be employed to clamp the raked up material against the rake head, and which during the raking operation is clamped against the rake teeth without interfering with the raking operation.

For the purpose of illustrating the invention, we have shown in the accompanying drawings a preferred embodiment of it which we have found in practice to give satisfactory and reliable results. It is however to be understood that the various instrumentalities of which the invention consists can be variously arranged and organized, and we do not therefore desire to be limited, except by the scope of the appended claim, to the exact arrangement and organization of these instrumentalities as herein set forth.

FIGURE 1 is a top plan view of a garden rake embodying our invention.

FIGURE 2 is a bottom plan view, partly broken away.

FIGURE 3 is a section on line 3—3 of FIGURE 1.

FIGURE 4 is a side elevation with the clamping plate in its open position ready to swing forwardly to pick up and clamp the raked up material against the rake head.

Similar numerals of reference indicate corresponding parts.

Referring to the drawings:

The rake has teeth 1 of any desired formation in cross section and illustrated as flat flexible strands disposed side by side and having their front end portions bent downwardly to contact the ground during the raking operation. The rear ends of the teeth are connected by a rear band 2 fixed thereto as shown by riveting. A central, laterally extending band 3 is riveted to the teeth. A bar 4 is fixed to the bands 2 and 3, deflected at a right angle intermediately of its length and secured to a rake handle 5 in any desired manner.

The pick up and clamping mechanism has a clamping plate 6 to which one end of a lever 7 is connected, the lever being pivoted to the bar 4. The lever has one end of a rod 10 pivoted to it at 9, and a handle sleeve 11 is pivoted at 12 to the rear end of the rod. The teeth are bent downwardly at 13 in front of the forward end of the clamping plate.

Marginal portions of the clamping plate 6 are bent upwardly at 14.

A desired number of stiffening strips 15 may be interwoven with the teeth in front and in rear of the central band 3.

During the raking operation, the handle sleeve is at its rearward position and the clamping plate is clamped against the bottom of the rake head in rear of the front, downwardly bent portions of the teeth. When it is desired to pick up the leaves, trash or other material which has been raked up, the handle sleeve is moved forwardly moving the clamping plate into the position seen in FIGURE 4 and the handle sleeve is then drawn rearwardly to swing the clamping plate forwardly and clamp the material between it and the bottom of the rake head. The clamping plate moves forwardly beneath the material to be collected disposed below the rake head and then is moved upwardly to clamp the material between it and the bottom of the rake head. Thus the clamping plate acts as a clamp and not as a scoop.

The clamping plate is substantially flat with only a slight upturn at its side marginal portions.

It will be noted that the clamping plate has its opposite sides and rear end bent upwardly, so that there is a space between the rake and the clamping plate when the latter is in clamped position.

Having thus described our invention, what we claim as new and desire to secure by Letters Patent is:

A garden rake, comprising a rake head, having laterally spaced teeth bent downwardly at their front ends, a clamping plate comprising a flat imperforate plate having opposite sides and the rear end portions bent upwardly to space the plate from the rake teeth when in clamped position, and with the forward end of the plate terminating in the rear of the bent down ends of the rake teeth, a rake handle connected with the rake head, a lever connected with said clamping plate and pivotally mounted on the rake handle, a handle sleeve on the rake handle, and a rod pivotally connected with said handle sleeve and with said lever.

References Cited in the file of this patent

UNITED STATES PATENTS

| | | |
|---|---|---|
| 1,515,740 | Laidley | Nov. 18, 1924 |
| 2,797,544 | Fite | July 2, 1957 |
| 2,891,374 | Richmond | June 23, 1959 |